(12) United States Patent
Usui (10) Patent No.: US 8,767,236 B2
(45) Date of Patent: Jul. 1, 2014

(54) IMAGE FORMING SYSTEM, IMAGE FORMING APPARATUS, IMAGE FORMING METHOD, AND STORAGE MEDIUM STORING PROGRAM THEREOF

(75) Inventor: Keiko Usui, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 13/037,904

(22) Filed: Mar. 1, 2011

(65) Prior Publication Data
US 2011/0242586 A1 Oct. 6, 2011

(30) Foreign Application Priority Data
Mar. 30, 2010 (JP) .................. 2010-079440

(51) Int. Cl.
*G06F 3/12* (2006.01)
(52) U.S. Cl.
USPC ......... 358/1.15; 358/1.13; 709/206; 709/221; 726/27
(58) Field of Classification Search
USPC ............... 358/1.15, 1.13, 1.14, 500; 345/581; 709/201, 206, 221; 713/182; 715/274; 726/27
See application file for complete search history.

(56) References Cited

U.S. PATENT DOCUMENTS

| 5,768,483 | A * | 6/1998 | Maniwa et al. ............... 358/1.15 |
| 6,693,718 | B1 * | 2/2004 | Takaoka ....................... 358/1.15 |
| 2005/0060649 | A1 * | 3/2005 | Kimura et al. ................ 715/526 |
| 2005/0073726 | A1 | 4/2005 | Nobuta et al. ................ 358/468 |
| 2005/0206973 | A1 * | 9/2005 | Shoji et al. ................... 358/500 |
| 2006/0001900 | A1 * | 1/2006 | Watanabe et al. ............ 358/1.14 |
| 2006/0026434 | A1 * | 2/2006 | Yoshida et al. ............... 713/182 |
| 2007/0211296 | A1 | 9/2007 | Toda |
| 2007/0226808 | A1 * | 9/2007 | Uchikawa ....................... 726/27 |
| 2008/0079985 | A1 * | 4/2008 | Ferlitsch ...................... 358/1.15 |
| 2009/0231353 | A1 * | 9/2009 | Han .............................. 345/581 |
| 2009/0316208 | A1 * | 12/2009 | Watanabe et al. ............ 358/1.15 |

FOREIGN PATENT DOCUMENTS

| JP | 08137487 A * | 5/1996 | ............ G10K 15/04 |
| JP | 08-186677 A | 7/1996 | |
| JP | 2005-269203 A | 9/2005 | |

OTHER PUBLICATIONS

U.S. Patent and Trademark Office, Office Action dated Nov. 7, 2012, in connection with U.S. Appl. No. 13/046,952 (14 pages).

* cited by examiner

*Primary Examiner* — David S Cammack
(74) *Attorney, Agent, or Firm* — Fitzpatrick, Cella, Harper & Scinto

(57) ABSTRACT

An image forming apparatus acquires and stores pieces of information indicating respective profiles, selects one profile based on the stored pieces of information, and transmits, to an information processing apparatus, an image reading setting corresponding to the selected profile and identification information for identifying the selected profile. The information processing apparatus changes an image reading setting included in a profile identified based on the transmitted identification information of the image forming apparatus to the transmitted image reading setting, and transmits an image reading instruction based on the changed profile to the image forming apparatus. The image forming apparatus receives the image reading instruction from the information processing apparatus, and reads the image to generate image data.

9 Claims, 12 Drawing Sheets

IMAGE FORMING SYSTEM, IMAGE FORMING APPARATUS, IMAGE FORMING METHOD, AND STORAGE MEDIUM STORING PROGRAM THEREOF

BACKGROUND OF THE INVENTION

1. Field of the Invention

The present invention relates to an image forming system, image forming apparatus, and image forming method for reading an image to acquire image data, and a storage medium storing a program thereof.

2. Description of the Related Art

Conventionally, cooperative performance of processing by an image forming apparatus and an external apparatus such as a PC has been used widely. The overall function cannot be achieved by a single image forming apparatus.

Japanese Patent Laid-Open No. 8-186677 discloses an image forming apparatus using a pseudo push scan function. This function can simplify the arrangement of the image forming apparatus, providing the apparatus at low cost. In Japanese Patent Laid-Open No. 8-186677, the user selects a host PC name and PC-side scan parameter set (to be referred to as a profile) he wants from choices representing host PC names and profiles displayed on the panel of the image forming apparatus. The user then transmits scanned image data to the host PC. The host PC performs image processing for the received image data based on an image processing method designated by a pull scan driver, and stores the resultant image data in a predetermined storage destination.

In addition to this pseudo push scan function, even an extended copy function is implemented by cooperation between an image forming apparatus and an external apparatus such as a host PC, similar to the pseudo push scan function.

For the pseudo push scan function, a profile displayed on the panel of the image forming apparatus is selected by pressing an OK key. The image forming apparatus transmits a profile number corresponding to the selected profile to the external apparatus using a dedicated protocol. The external apparatus transmits a scan execution instruction to the image forming apparatus based on profile settings corresponding to the received profile number. This method allows the user to select a profile while checking a mode setting (color/monochrome (black and white)) displayed on the panel of the image forming apparatus, and execute scanning in the mode setting of his choice.

However, although the panel displays mode settings to the user, information transmitted to the external apparatus after pressing the OK key is only a profile number. The mode setting is therefore determined by the external apparatus. The user has to make a selection based on only mode settings displayed on the panel of the image forming apparatus. A dedicated driver capable of setting a profile has been installed in the external apparatus. If the external apparatus changes the mode setting when not intended by the user, the output result that the user wants cannot be obtained. Even for the extended copy function, when a driver similar to that for the pseudo push scan function is used, the same problem arises because execution of a job starts with the same operation procedures.

For example, in some configurations, a plurality of parameters set in the driver of the external apparatus are assigned as a parameter set to a key on the image forming apparatus, and image reading or facsimile transmission is done in response to pressing the key. The parameter set includes the document size, resolution, color/black and white/gray scale, scan region, luminance, contrast, and destination. By pressing the key, scanning is executed with the desired settings. However, even if a parameter set can be registered to a key on the image forming apparatus, the setting of the parameter set cannot be changed on the image forming apparatus side, so the above-mentioned problem cannot be solved.

SUMMARY OF THE INVENTION

An aspect of the present invention is to eliminate the above-mentioned problems with the conventional technology. The present invention provides an image forming system, image forming apparatus, and image forming method for preventing execution not intended by the user in execution of a function which is operated cooperatively by an external apparatus and image forming apparatus, and a storage medium storing a program thereof.

The present invention in its first aspect provides an image forming system including an image forming apparatus which reads an image to generate image data, and an information processing apparatus which has a database for storing a plurality of profiles each including a setting for reading the image and can change the setting of each of the plurality of profiles, the image forming apparatus comprising: a storage unit configured to acquire and store pieces of information each indicating each of the plurality of profiles; a selection unit configured to select one profile based on the pieces of information stored in the storage unit; a first transmission unit configured to transmit, to the information processing apparatus, a setting for reading the image that corresponds to the profile selected by the selection unit, and identification information for identifying the selected profile; a reception unit configured to receive a reading instruction for the image from the information processing apparatus; and a reading unit configured to read the image to generate image data in accordance with the reading instruction for the image that has been received by the reception unit, and the information processing apparatus comprising: a second transmission unit configured to change a setting for reading the image that is included in a profile identified based on the identification information transmitted by the first transmission unit of the image forming apparatus to the setting for reading the image that has been transmitted by the first transmission unit, and transmit the reading instruction for the image based on the changed profile to the image forming apparatus.

The present invention in its second aspect provides an image forming method executed in an image forming system including an image forming apparatus which reads an image to generate image data, and an information processing apparatus which has a database for storing a plurality of profiles each including a setting for reading the image and can change the setting of each of the plurality of profiles, the method comprising: a storage step of causing the image forming apparatus to acquire and store pieces of information each indicating each of the plurality of profiles; a selection step of causing the image forming apparatus to select one profile based on the pieces of information stored in the storage step; a first transmission step of causing the image forming apparatus to transmit, to the information processing apparatus, a setting for reading the image that corresponds to the profile selected in the selection step, and identification information for identifying the selected profile; a second transmission step of causing the information processing apparatus to change a setting for reading the image that is included in a profile identified based on the identification information transmitted in the first transmission step by the image forming apparatus to the setting for reading the image that has been transmitted in the first transmission step, and transmit a reading instruction for the image based on the changed profile to the image forming apparatus; a reception step of causing the image forming apparatus to receive the reading instruction for the image from the information processing apparatus; and a reading step of causing the image forming apparatus to read the image and generate image data in accordance with the reading instruction for the image that has been received in the reception step.

The present invention in its third aspect provides an image forming apparatus which is connected to an information processing apparatus that has a database for storing a plurality of profiles each including a setting for reading an image and can change the setting of each of the plurality of profiles, and which reads an image to generate image data, the image forming apparatus comprising: a storage unit configured to acquire and store pieces of information each indicating each of the plurality of profiles; a selection unit configured to select one profile based on the pieces of information stored in the storage unit; a key control unit configured to control to enable, in accordance with the setting for reading the image that corresponds to the one profile selected by the selection unit, an operation of a key indicating that an image reading operation is executable; a transmission unit configured to transmit, to the information processing apparatus in response to accepting pressing of the key, the setting for reading the image that corresponds to the profile selected by the selection unit, and identification information for identifying the selected profile; a reception unit configured to receive a reading instruction for the image from the information processing apparatus; and a reading unit configured to read the image to generate image data in accordance with the reading instruction for the image that has been received by the reception unit.

The present invention in its fourth aspect provides an image forming method executed in an image forming apparatus which is connected to an information processing apparatus that has a database for storing a plurality of profiles each including a setting for reading of image and can change the setting of each of the plurality of profiles, and which reads an image to generate image data, the method comprising: a storage step of acquiring and storing pieces of information each indicating each of the plurality of profiles; a selection step of selecting one profile based on the pieces of information stored in the storage step; a key control step of controlling to enable, in accordance with the setting for reading of the image that corresponds to the one profile selected in the selection step, an operation of a key indicating that an image reading operation is executable; a transmission step of transmitting, to the information processing apparatus in response to accepting pressing of the key, the setting for reading the image that corresponds to the profile selected in the selection step, and identification information for identifying the selected profile; a reception step of receiving a reading instruction for the image from the information processing apparatus; and a reading step of reading the image to generate image data in accordance with the reading instruction for the image that has been received in the reception step.

The present invention in its fifth aspect provides a non-transitory computer-readable storage medium storing a program for causing a computer to function to select one profile based on pieces of information which are stored in a memory and indicate respective profiles; control to enable, in accordance with a setting for reading of an image that corresponds to the one selected profile, an operation of a key indicating that an image reading operation is executable; and transmit, to a connected information processing apparatus in response to accepting pressing of the key, the setting for reading the image that corresponds to the selected profile, and identification information for identifying the selected profile.

The present invention can prevent execution not intended by the user in execution of a function which is operated cooperatively by an external apparatus and image forming apparatus.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same parts, and a repetitive description thereof will be omitted.

First Embodiment

Figure 1:
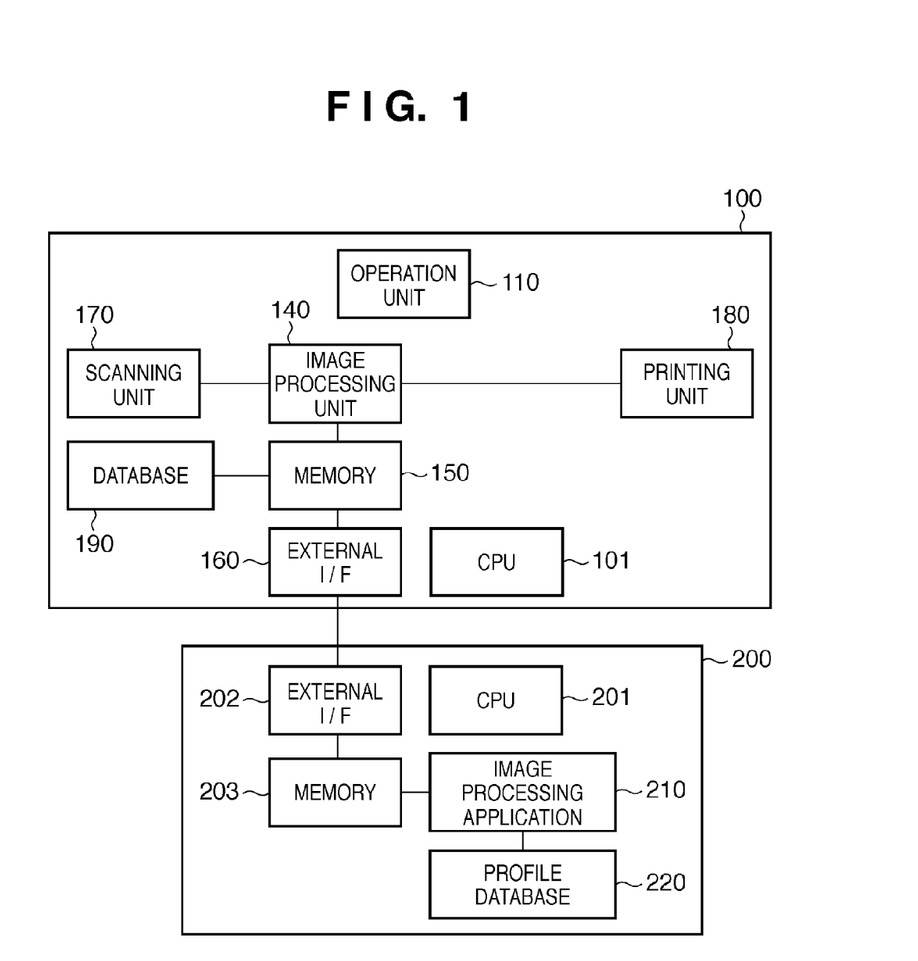
FIG. 1 is a block diagram showing the configuration of an image forming system including an image forming apparatus.

FIG. 1 is a block diagram showing the configuration of an image forming system including an image forming apparatus according to the first embodiment of the present invention. An image forming apparatus 100 is, for example, a copying machine. A CPU 101 controls blocks (to be described later) within the image forming apparatus 100. An operation unit 110 accepts a user instruction. A scanning unit 170 reads a document to acquire scanned image data. An image processing unit 140 performs image processing for the scanned image data. A memory 150 stores image data having undergone image processing by the image processing unit 140, and its attribute data. An external I/F 160 is an interface for communicating with an external apparatus 200. For example, the external I/F 160 transmits, to the external apparatus 200, image data and its attribute data which are stored in the memory 150. A printing unit 180 performs print processing for image data stored in the memory 150. If necessary, the image data undergoes print processing after image processing by the image processing unit 140. A database 190 stores a profile acquired from the external apparatus 200 by polling. In FIG. 1, the scanning unit 170 and printing unit 180 are shown as building components within the image forming apparatus 100, but either or both of them may be external units.

The external apparatus 200 is an information processing apparatus such as a PC, and includes a CPU 201. The CPU 201 controls blocks (to be described later) within the external apparatus 200. An external I/F 202 is an interface for communicating with another apparatus. A memory 203 stores image data to be transmitted/received via the external I/F 202. An image processing application 210 performs image processing for image data in accordance with the settings of a profile stored in a profile database 220. The external apparatus 200 transmits image data having undergone image processing to the image forming apparatus 100 via the external I/F 202. The profile database 220 stores a plurality of profiles, each of which sets what kind of image processing is to be done.

In the first embodiment, the image forming apparatus 100 and external apparatus 200 as shown in FIG. 1 cooperatively operate to execute the extended copy function. To execute the extended copy function, a dedicated driver is installed in the external apparatus 200. The dedicated driver installed in the external apparatus 200 allows changing, for example, various settings in scanning. In this case, the extended copy function means the following function. First, the external apparatus 200 transmits a scan execution instruction to the image forming apparatus 100, and the image forming apparatus 100 executes scanning. The image forming apparatus 100 then transmits the scanned image data to the external apparatus 200, and the external apparatus 200 stores it. Further, the external apparatus 200 transmits the image data having undergone image processing to the image forming apparatus 100, and the image forming apparatus 100 performs print processing.

Figure 2:
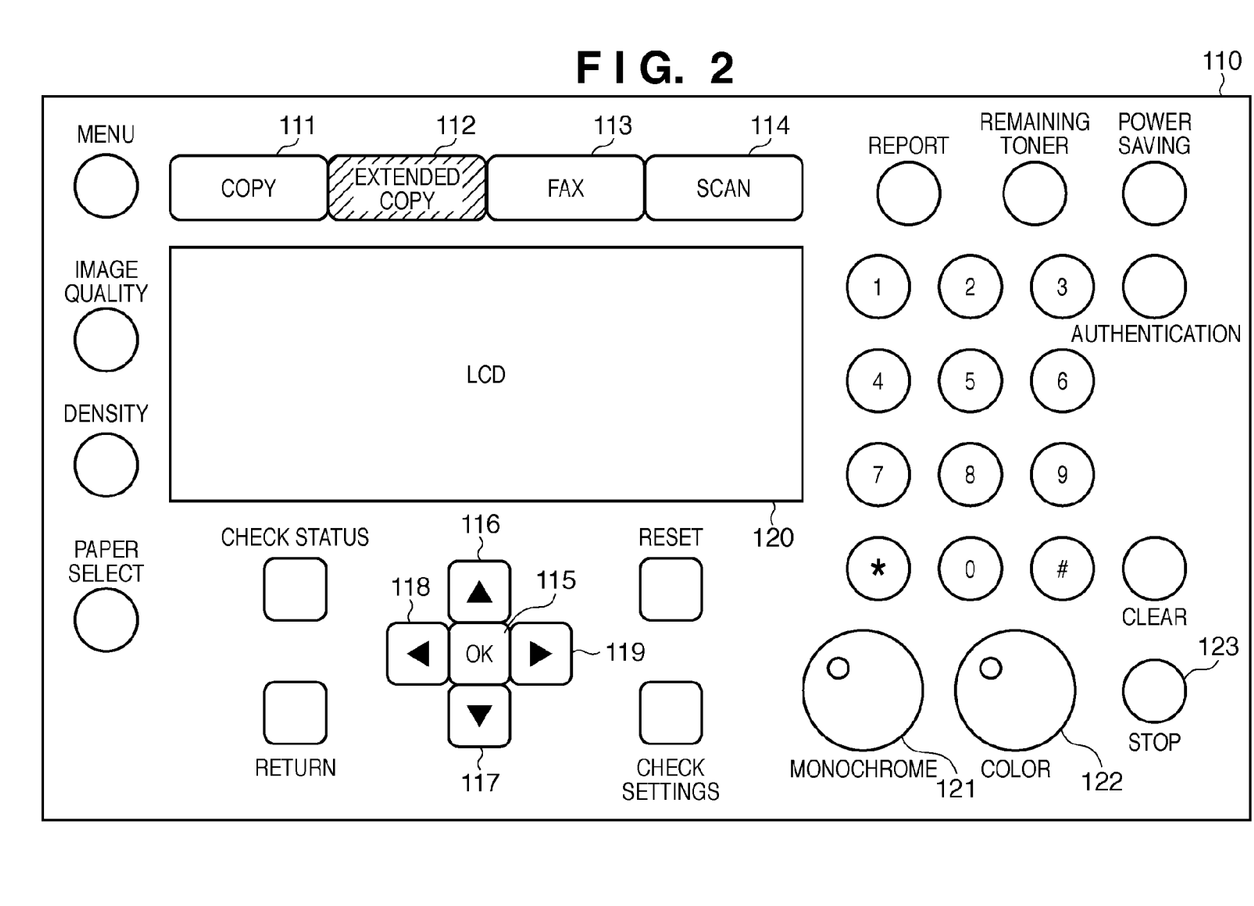
FIG. 2 is a view exemplifying an operation unit.

FIG. 2 is a view exemplifying the operation unit 110 of the image forming apparatus 100. Keys 111, 112, 113, and 114 are function keys for designating job execution of the copy function, extended copy function, facsimile function, and scan function, respectively. When the user presses one of these keys, the screen shifts to the basic setting screen of each function. When the user selects a function key, the display is highlighted. For example, in FIG. 2, the display of "extended copy" is highlighted to indicate that job execution of the function is designated. An OK key 115 is used to select and finalize an item. Keys 116, 117, 118, and 119 are up, down, left, and right arrow keys, and are used to move the item. A display unit 120 is, for example, an LCD, and displays an operation screen such as a basic setting screen. A key 121 is used to start execution in the black and white mode (to be also referred to as a monochrome mode), and lighting it indicates that the key 121 can be pressed. Similarly, a key 122 is used to start execution in the color mode, and lighting it indicates that the key 122 can be pressed. In the embodiment, the user selects a profile he wants by pressing the key 121 or 122, which will be described later. A key 123 is used to stop a job which has started.

Figure 3:
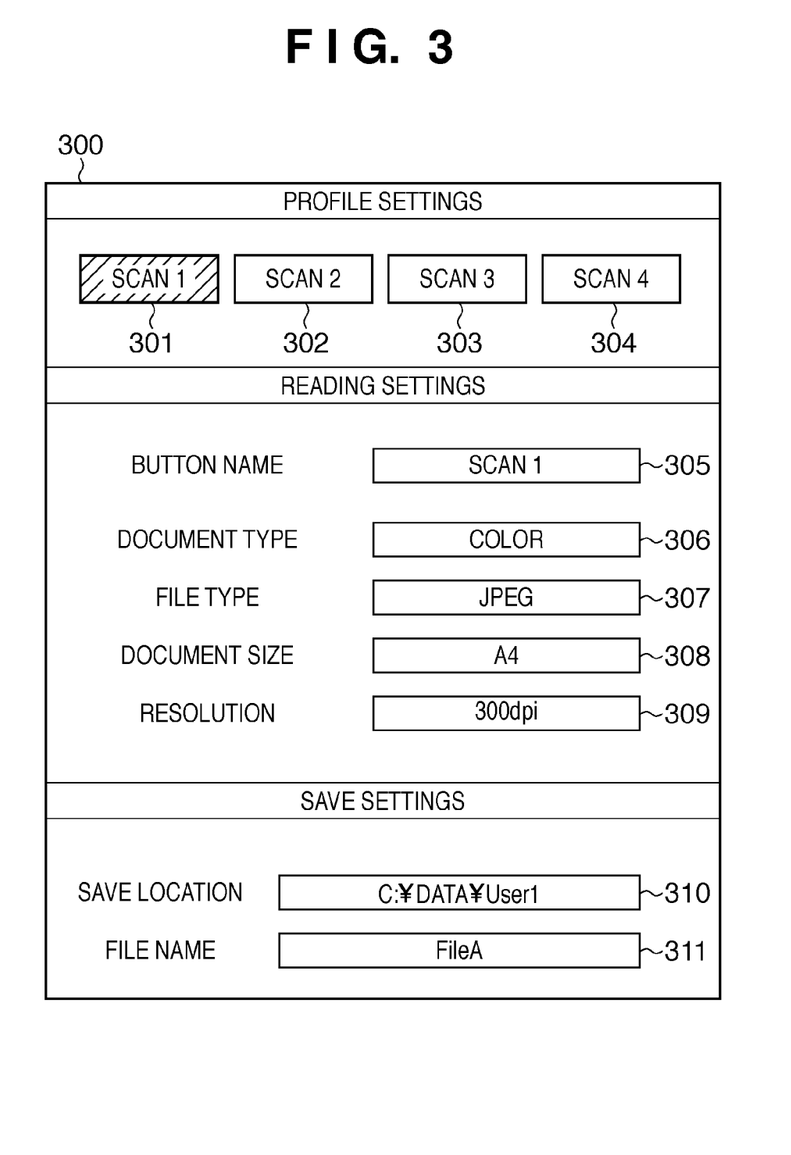
FIG. 3 is a view exemplifying a setting screen in an external apparatus 200.

FIG. 3 is a view exemplifying a setting screen in a dedicated driver installed in the external apparatus 200 to execute the extended copy function in the embodiment. A screen 300 is a setting screen in a dedicated driver for the pull scan function or push scan function, and a scan profile is set on the screen 300. Keys 301, 302, 303, and 304 indicate the profiles of respective scans, and allow custom setting of the respective profiles by pressing them. When each key is pressed, fields 305 to 311 display set values previously input by the user or default set values. The user can change set values displayed in the fields 305 to 311 to values of his choice.

The field 305 represents a profile name. If the user changes the profile name, the changed profile name is reflected in even the displays of the keys 301 to 304. The field 306 represents the type of document in image scanning. In the embodiment, choices are "monochrome/color", "color", "monochrome", "monochrome (OCR)", "gray scale", and "color (magazines, catalogs)", and are displayed as a pull-down list. The field 307 is used to designate a file format for save, such as JPEG, TIFF, PDF, or BMP. The field 308 is used to designate the size of a document to be scanned. The field 309 is used to designate the resolution of an image to be scanned. The field 310 is used to designate a location (path) where the image is to be saved. The field 311 is used to designate the name of a saved file. Based on setting values in the fields 305 to 311, desired scanned image data can be acquired.

Figure 4A:
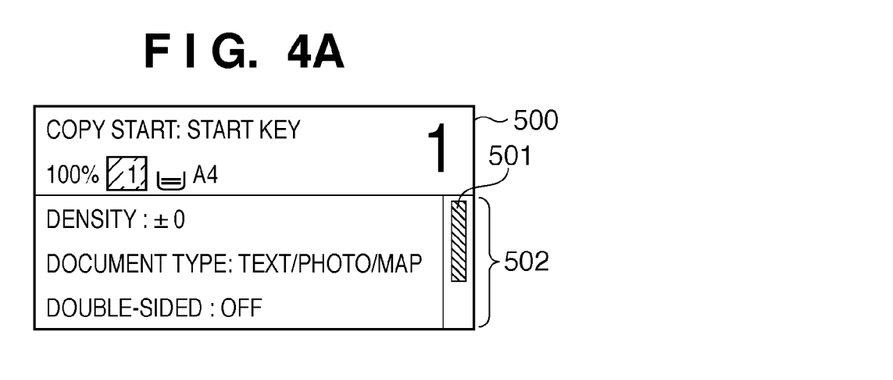
FIGS. 4A to 4F are views each exemplifying a screen displayed on the display unit of the operation unit.

FIGS. 4A to 4F are views each exemplifying a screen displayed on the display unit 120 of the operation unit 110 of the image forming apparatus 100. FIG. 4A is a view showing a screen, when the user presses the key 112 indicating the extended copy function. A screen 500 is a basic setting screen for the extended copy function. The display is formed from five lines, and the first line displays the current state. The second line displays the copy ratio and selected paper feed source information. The number of copies is displayed large numerically at the right end of the first and second lines. The third to fifth lines display operation mode items 502 which can be designated in the copy function. If all items are not displayed, the user can scroll the screen using a scroll bar 501.

Figure 4B:
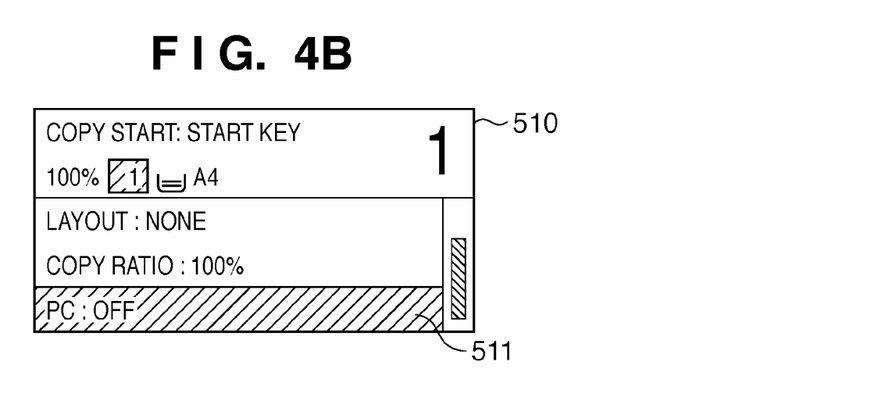

FIG. 4B is a view showing a PC connection setting item displayed by scrolling down the screen shown in FIG. 4A. In the embodiment, a PC connection setting "shown as (PC: OFF)" item 511 in a screen 510 may be set in the operation mode items in response to pressing not the key 112 but the key 111 which designates job execution of the copy function. When the user presses the OK key 115 in the screen shown in FIG. 4B, the screen shifts to a detailed setting screen for the extended copy function shown in FIG. 4C.

Figure 4C:
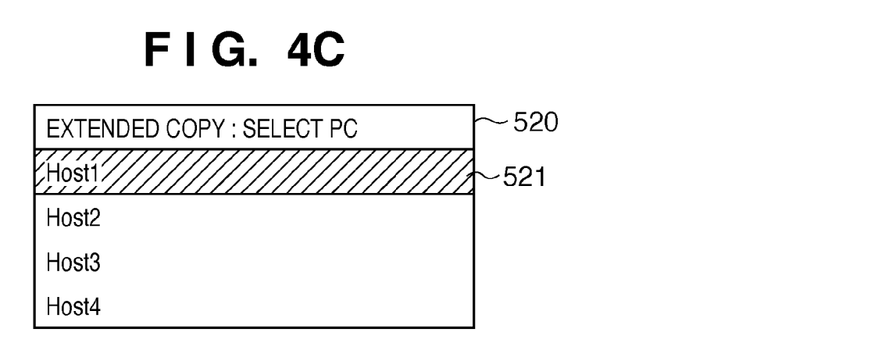

FIG. 4C is a view exemplifying a detailed setting screen for the extended copy function. A screen 520 displays a screen for selecting an external apparatus 200 such as a PC to be used in execution of the extended copy function. In the embodiment, the external apparatus 200 transmits the name of the external apparatus 200 and profiles held in it in response to polling or the like from the image forming apparatus 100. The image forming apparatus 100 stores these data in the database 190, and when displaying the screen 520 of FIG. 4C, acquires the name of the external apparatus 200 from the database 190. In FIG. 4C, "Host1" in an item 521 is highlighted to be selected.

Figure 4D:
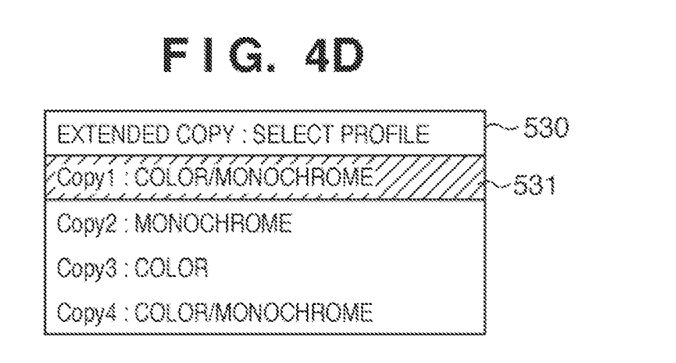

FIG. 4D shows a screen representing a list of all profiles corresponding to the external apparatus 200 selected in FIG. 4C. As represented by an item 531 of a screen 530, each profile name and a mode setting (monochrome/color) set in the profile are displayed as the contents of the list.

Figure 4E:
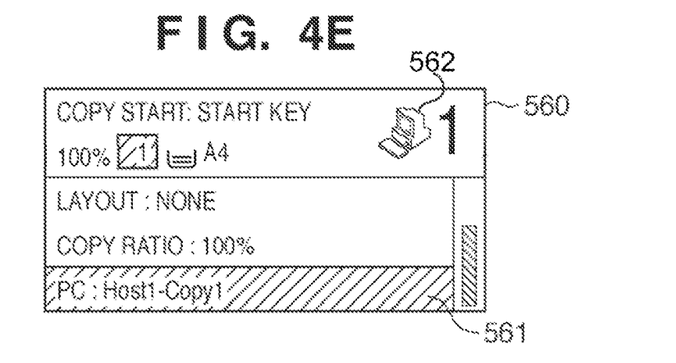

FIG. 4E is a view showing a basic setting screen for the extended copy function displayed when the settings in FIGS. 4B to 4D are made. As shown in a screen 560 in FIG. 4E, a connected external apparatus icon 562 is displayed. An item may be highlighted to show details such as 561.

Figure 4F:
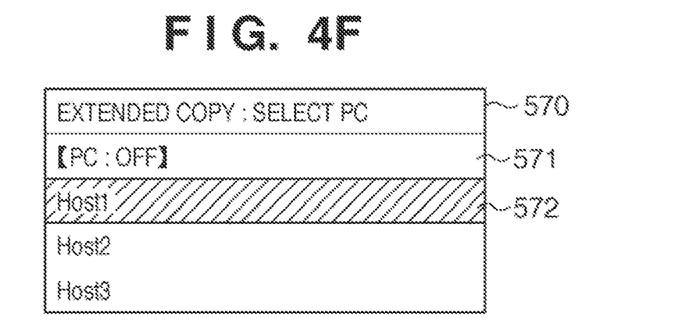

FIG. 4F is a view showing a screen displayed to select an external apparatus 200 while the external apparatus 200 is connected. In this case, a "PC: OFF" item 571 is displayed in addition to items displayed in the screen of FIG. 4C. The currently selected external apparatus 200 is highlighted as represented by an item 572. When the user selects the "PC:

OFF" item and presses the OK key 115 in a screen 570, the screen shifts to the basic setting screen shown in FIG. 4A.

Figure 5:
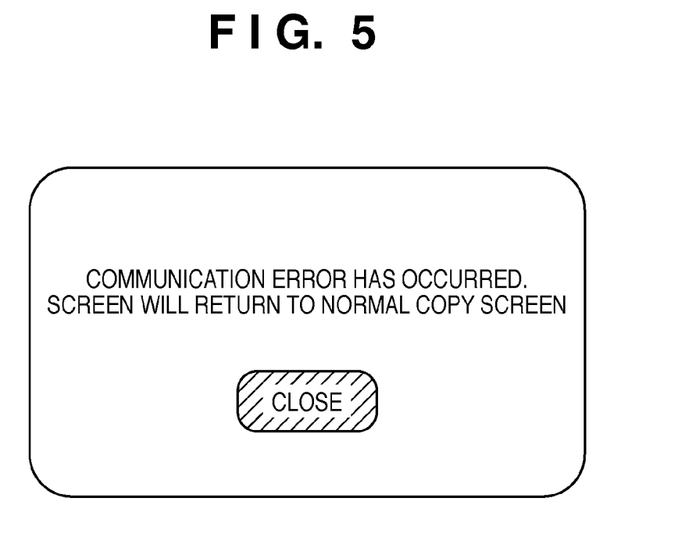
FIG. 5 is a view exemplifying an error screen.

FIG. 5 is a view exemplifying an error screen displayed when the settings in FIGS. 4B to 4D are made. FIG. 5 shows an error screen displayed when the external apparatus 200 is selected and then it is determined that the external apparatus 200 cannot be accessed. When the user presses the OK key 115 in this screen, a screen (not shown) corresponding to pressing of the key 111 indicating the normal copy function appears.

Figure 6:
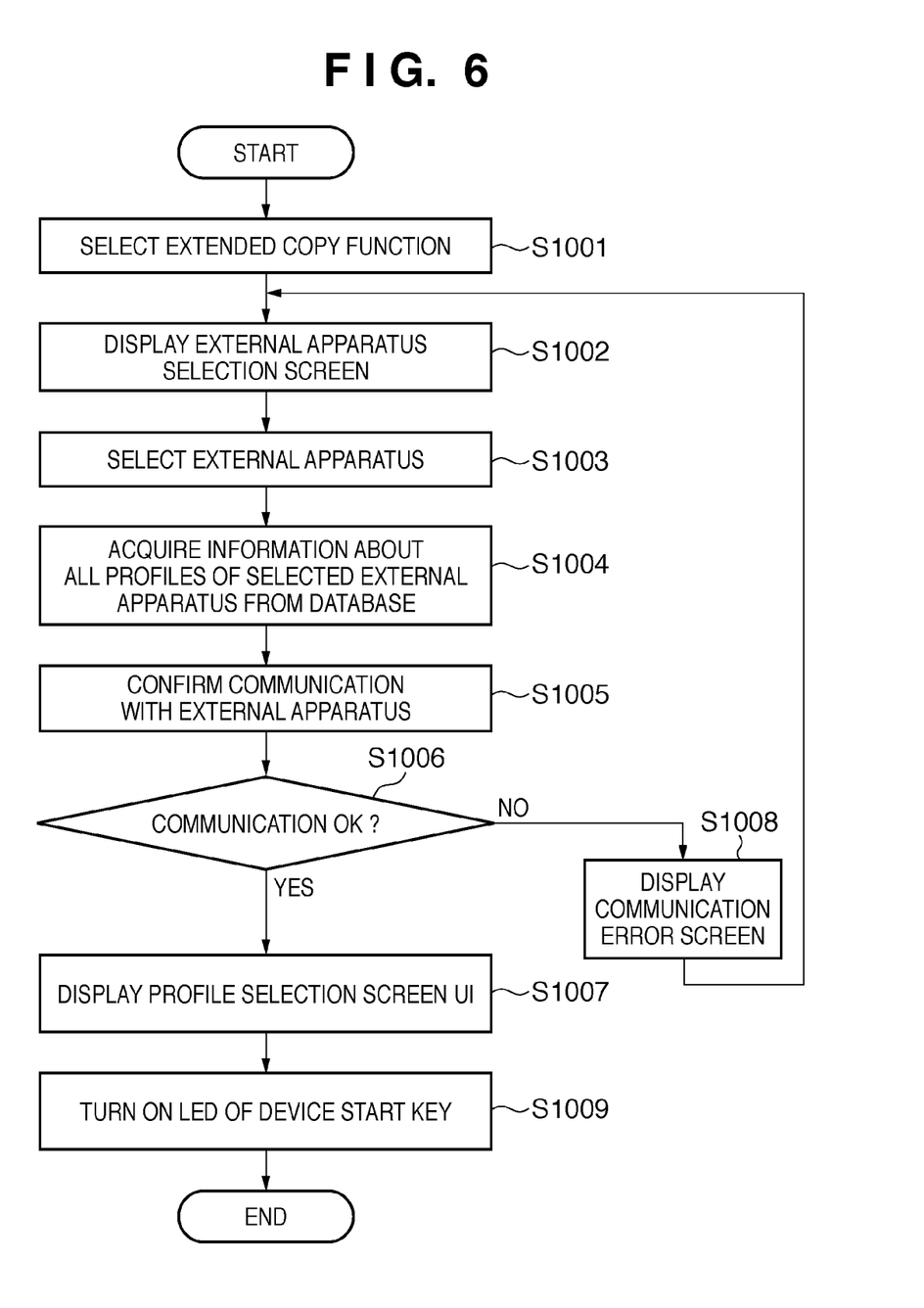
FIG. 6 is a flowchart showing an operation until the image forming apparatus displays a profile selection screen.

FIG. 6 is a flowchart showing an operation sequence until the profile selection screen is displayed after the user selects the extended copy function in the image forming apparatus 100. For example, the CPU 101 of the image forming apparatus 100 executes processing shown in this flowchart. First in step S1001, after power-on of the image forming apparatus 100, the user selects the PC connection setting item 511 by pressing the OK key 115 from the basic setting screen (FIG. 4B) for the extended copy function that appears in response to pressing the key 112. In step S1002, the image forming apparatus 100 displays the screen 520 shown in FIG. 4C to select the external apparatus 200. The screen 520 shown in FIG. 4C displays a list of external apparatuses 200 connected to the image forming apparatus 100, so the user selects an external apparatus 200 he wants by pressing the OK key 115 (step S1003).

In step S1004, the image forming apparatus 100 acquires, from the database 190, information for displaying a list of all profiles corresponding to the external apparatus 200 selected by the user. In this case, profiles corresponding to the external apparatus 200 are acquired by periodically polling the external apparatus 200, and registered in the database 190 in advance. For example, profiles corresponding to the external apparatus 200 are acquired by periodically polling the external apparatus 200, and registered in the database 190 till step S1003 after the image forming apparatus 100 is turned on.

In step S1005, the image forming apparatus 100 tries to communicate with the external apparatus 200, and determines whether communication with the external apparatus 200 is possible (step S1006). Communication in step S1005 may adopt any method, and may be done by a "ping" command or the like. If the image forming apparatus 100 determines in step S1006 that communication is possible, it displays a list of all profiles corresponding to the selected external apparatus 200 on a display unit (not shown), as shown in FIG. 4D (step S1007). If the image forming apparatus 100 determines that communication is impossible, it displays an error screen as shown in FIG. 5, and displays again the screen 520 shown in FIG. 4C to select the external apparatus 200. The image forming apparatus 100 then returns to step S1002 (step S1008).

In step S1007, a profile name displayed at the top is pointed with the cursor and highlighted. The list may display both the profile name and mode setting or only the profile name. In step S1009, the image forming apparatus 100 acquires, from the database 190, a mode setting corresponding to the profile name which is pointed with the cursor and highlighted, turns on the LED of the corresponding key 121 or 122 (example of key control), and then ends the processing.

Figure 7:
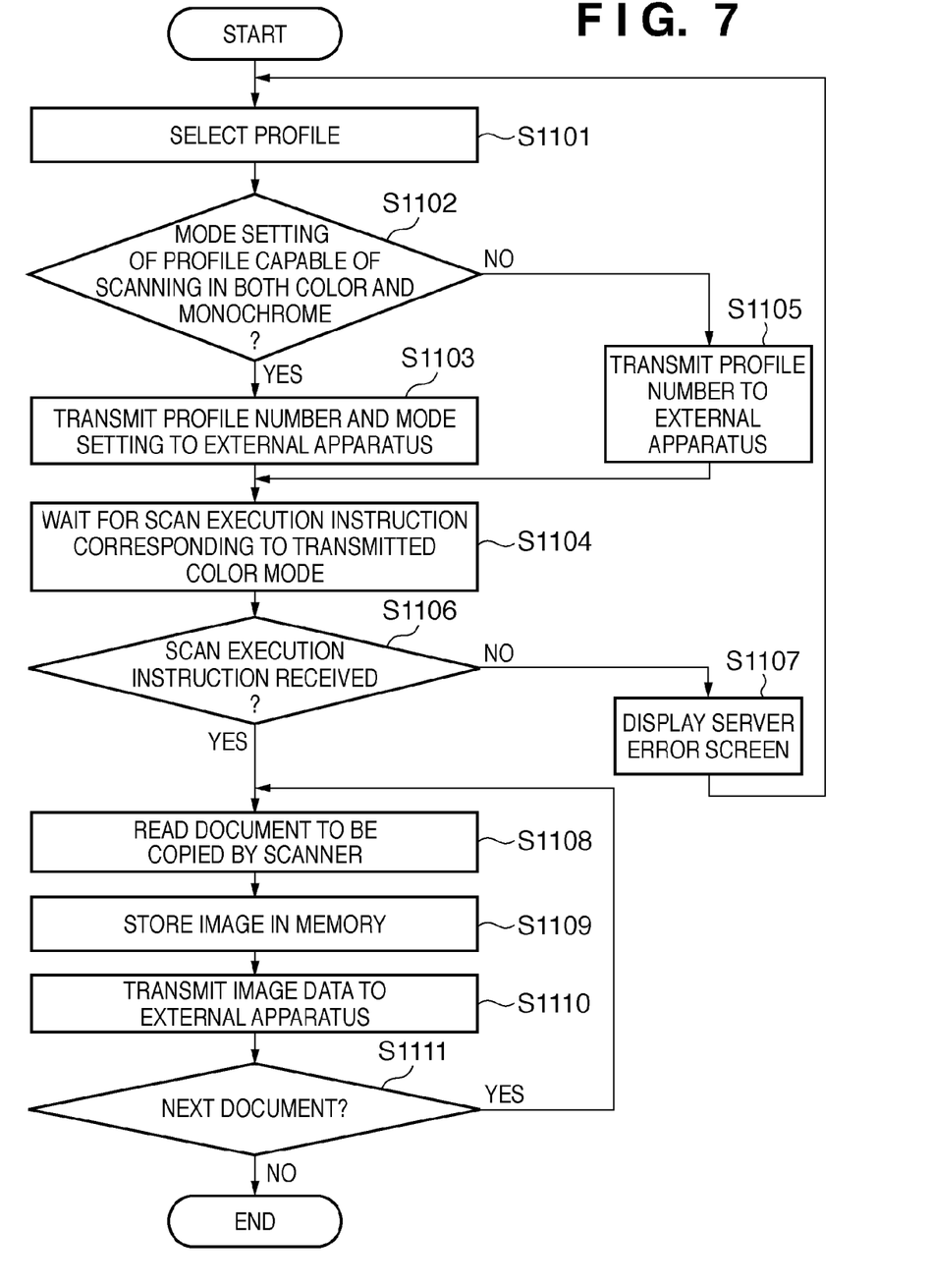
FIG. 7 is a flowchart showing processing until image data is transmitted after a profile is selected.

FIG. 7 is a flowchart showing a processing sequence until the image forming apparatus 100 transmits image data to the external apparatus 200 after the user selects a profile he wants in the image forming apparatus 100. For example, the CPU 101 of the image forming apparatus 100 executes processing shown in this flowchart. In step S1101, the user selects a profile he wants from the profile selection screen 530 by pressing a key (key 121 or 122) whose LED has been turned on in step S1009 described above. After selecting the profile, the image forming apparatus 100 executes a job of the extended copy function. In step S1102, the image forming apparatus 100 determines whether the mode setting of the selected profile is capable of scanning in either or both of color and monochrome. If the image forming apparatus 100 determines that the mode setting of the selected profile is capable of scanning in either or both of color and monochrome, it advances to step S1103. In step S1103, the image forming apparatus 100 transmits, to the external apparatus 200, a profile number (identification information for identifying a profile) and mode setting which correspond to the selected profile (example of the first transmission). If the image forming apparatus 100 determines that the mode setting of the selected profile is incapable of scanning in any of color and monochrome, it advances to step S1105 to transmit only a profile number corresponding to the selected profile.

In step S1104, the image forming apparatus 100 waits for a scan execution instruction corresponding to the notified profile number. In step S1106, the image forming apparatus 100 determines whether it has received a scan execution instruction from the external apparatus 200. If the image forming apparatus 100 determines that it has not received a scan execution instruction, it determines that an error has occurred in a server or the like, and displays an error screen (not shown) to this effect (step S1107). If the image forming apparatus 100 determines that it has received a scan execution instruction, it advances to step S1108.

In step S1108, the scanning unit 170 reads a document, generating image data. In step S1109, the image processing unit 140 performs image processing for the scanned image data and stores the resultant image data in the memory 150. In step S1110, the image forming apparatus 100 transmits, to the selected external apparatus 200 via the external I/F 160, the image data which has undergone image processing and is stored in the memory 150. In step S1111, the image forming apparatus 100 determines whether the next document exists. If the image forming apparatus 100 determines that the next document exists, it returns to step S1108; if it determines that no next document exists, it ends the processing.

Figure 8:
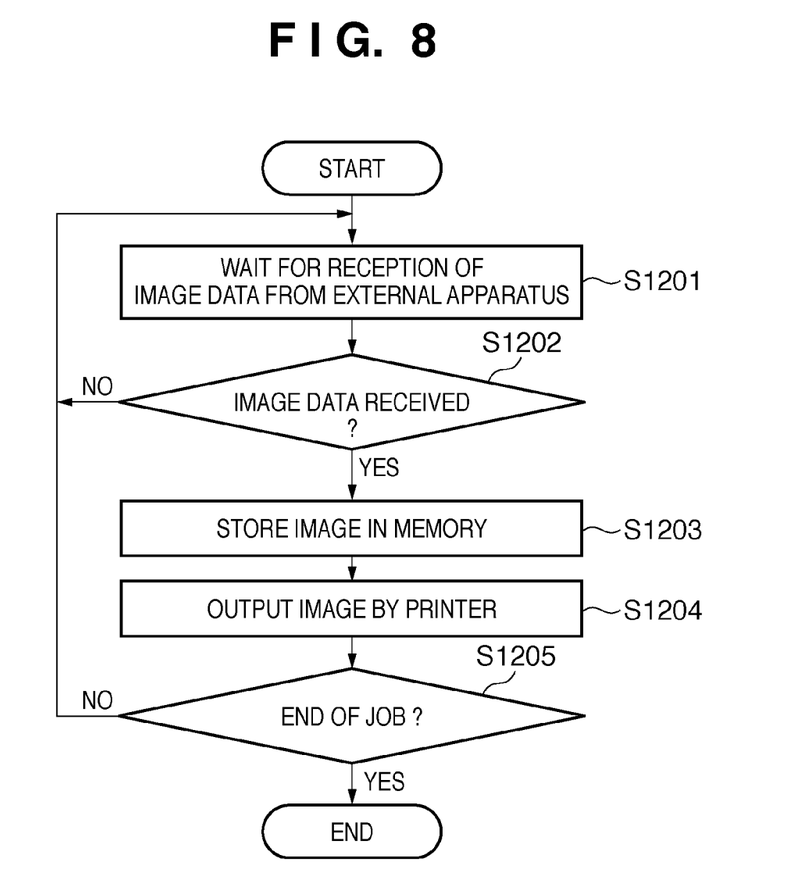
FIG. 8 is a flowchart showing processing until the image forming apparatus receives image data from the external apparatus and prints it.

FIG. 8 is a flowchart showing a processing sequence until the image forming apparatus 100 receives image data from the external apparatus 200 and prints it. For example, the CPU 101 of the image forming apparatus 100 executes processing shown in this flowchart. The received image data has undergone image processing in the external apparatus 200, as needed. First in step S1201, the image forming apparatus 100 waits for reception of image data which has undergone image processing and is transmitted from the external apparatus 200 via the external I/F 160. In step S1202, the image forming apparatus 100 determines whether it has received image data. If the image forming apparatus 100 determines that it has received image data, it advances to step S1203; if it determines that it has not received image data, returns to step S1201. In step S1203, the image forming apparatus 100 stores the received image data in the memory 150. In step S1204, the printing unit 180 performs print processing for the image data stored in the memory 150. In step S1205, the image forming apparatus 100 determines whether all target jobs of the extended copy function have ended. If the image forming apparatus 100 determines that there is a job which has not ended, that is, there is image data which has not been received, it returns to step S1201. If the image forming apparatus 100 determines that all jobs have ended, it ends the processing.

Figure 9:
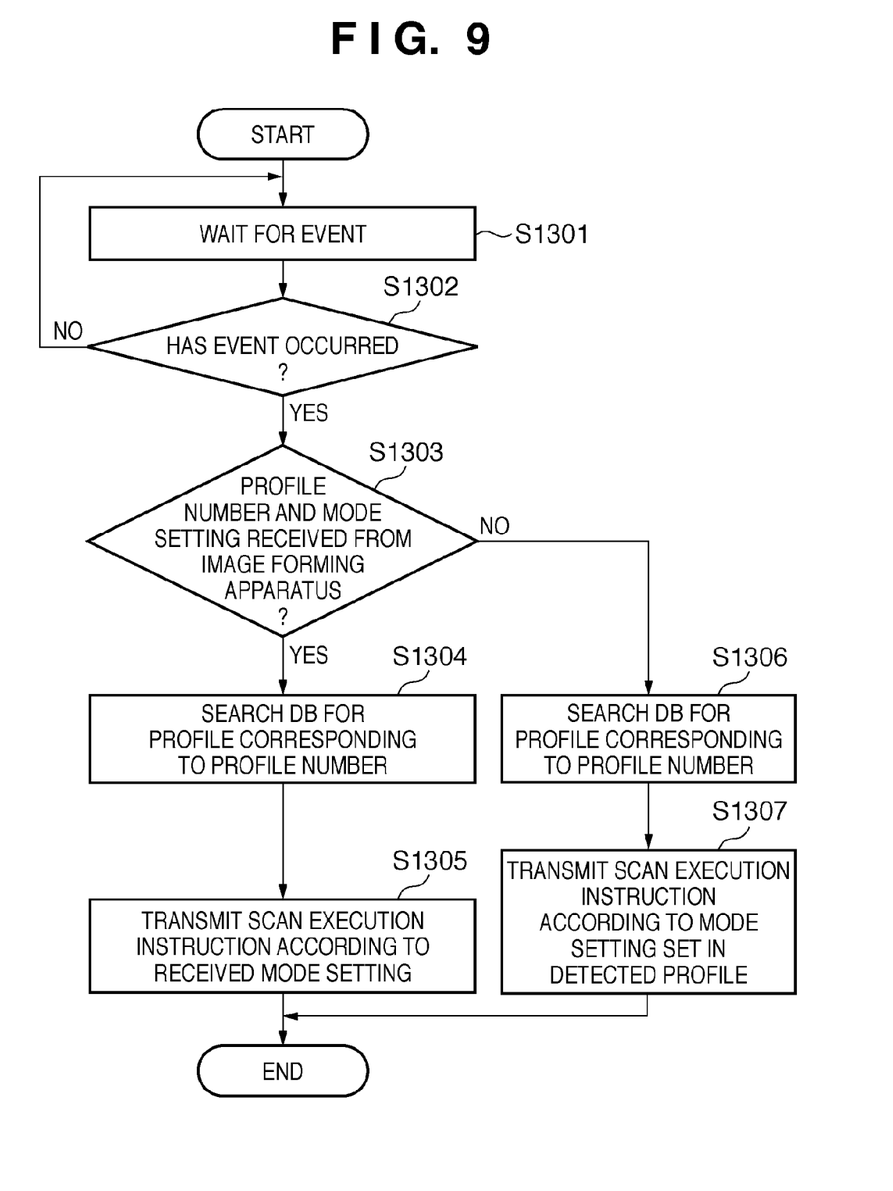
FIG. 9 is a flowchart showing processing when the external apparatus receives a profile number.

FIG. 9 is a flowchart showing a processing sequence when the external apparatus 200 receives a profile number corresponding to a profile selected by the image forming apparatus 100. First in step S1301, the external apparatus 200 waits for reception of a profile number from the image forming apparatus 100 (corresponding to step S1103 or S1105 in FIG. 7). In step S1302, the external apparatus 200 determines whether it has received a profile number from the image forming apparatus 100. If the external apparatus 200 determines that it has not received a profile number, it returns to step S1301. If the external apparatus 200 determines that it has received a profile number, it advances to step S1303.

In step S1303, the external apparatus 200 determines whether it has received a mode setting and profile number or only a profile number from the image forming apparatus 100. If the external apparatus 200 determines that it has received a mode setting and profile number, it searches the profile database 220 for a profile corresponding to the received profile number in step S1304. In step S1305, the external apparatus 200 transmits a scan execution instruction to the image forming apparatus 100 via the external I/F 160 in accordance with the received mode setting.

If the external apparatus 200 determines in step S1303 that it has received only a profile number, it advances to step S1306. In step S1306, the external apparatus 200 searches the profile database 220 for a profile corresponding to the received profile number. In step S1307, the external apparatus 200 transmits a scan execution instruction to the image forming apparatus 100 via the external I/F 160 in accordance with a mode setting set in the detected profile (example of the second transmission).

Figure 10:
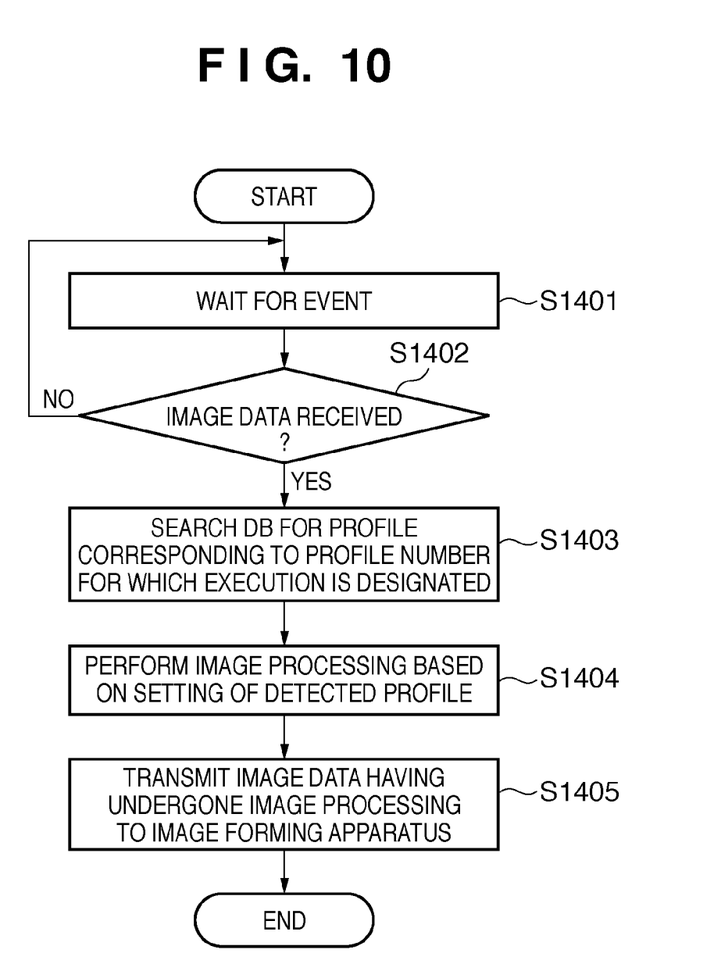
FIG. 10 is a flowchart showing processing when the external apparatus receives image data.

FIG. 10 is a flowchart showing a processing sequence when the external apparatus 200 receives image data from the image forming apparatus 100. For example, the CPU 201 of the external apparatus 200 executes processing shown in this flowchart. First in step S1401, the external apparatus 200 waits for reception of scanned image data from the image forming apparatus 100 (corresponding to step S1111 in FIG. 7). In step S1402, the external apparatus 200 determines whether it has received scanned image data from the image forming apparatus 100. If the external apparatus 200 determines that it has not received scanned image data, it returns to step S1401. If the external apparatus 200 determines that it has received scanned image data, it stores the received image data in the memory 203 in step S1403. Then, the external apparatus 200 searches profiles stored in the profile database 220 for a profile corresponding to the profile number, and analyzes the setting. In step S1404, the external apparatus 200 performs, for the received image data, image processing set in the detected profile. In step S1405, the external apparatus 200 transmits the image data having undergone image processing to the image forming apparatus 100 via the external I/F 160.

As described above, according to the first embodiment, when the user selects a profile on the image forming apparatus in executing the extended copy function cooperatively by the external apparatus and image forming apparatus, the LED of a key is turned on in accordance with a mode setting (color/monochrome) set in the profile. The user presses the key whose LED is ON, transmitting a mode setting of his choice to the external apparatus. The external apparatus always transmits a scan execution instruction to the image forming apparatus in accordance with the mode setting transmitted to the external apparatus. As a result, even if the driver of the external apparatus has changed the setting, the scan execution instruction always complies with a setting the user wants. By turning on the LED of a key to indicate that a corresponding mode setting is executable, user friendliness can be visually improved to prevent an operation error. Further, not an operation on the panel, but a key operation similar to a conventional one can be implemented.

Second Embodiment

The second embodiment omits determination processing S1102 in the flowchart shown in FIG. 7. That is, a profile number corresponding to a selected profile and a mode setting corresponding to a pressed key (key 121 or 122) are always transmitted to an external apparatus 200 regardless of a profile selected in the list shown in FIG. 4D.

Figure 11:
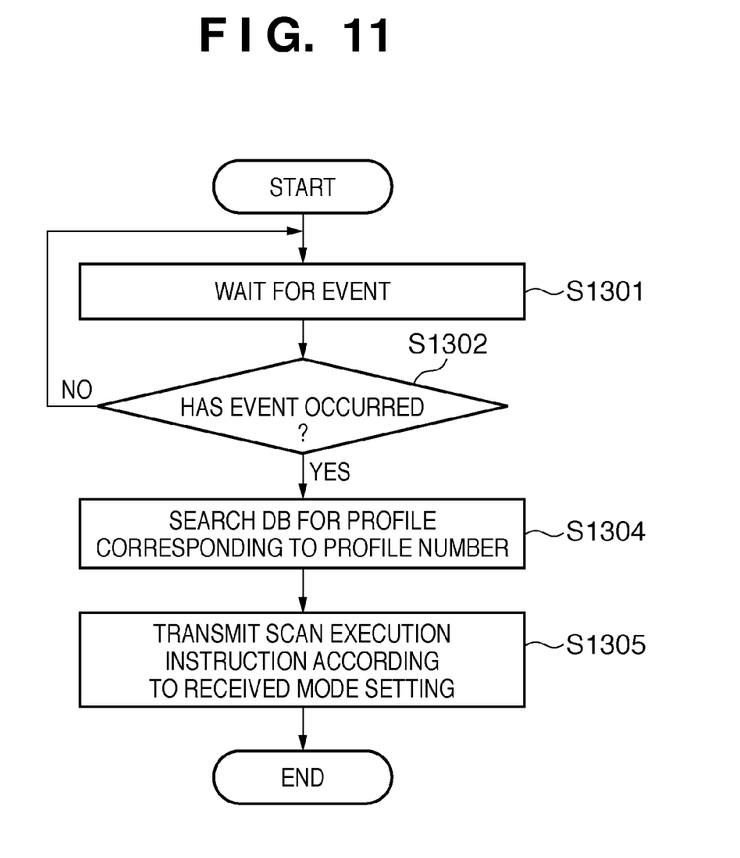
FIG. 11 is a flowchart showing another processing when the external apparatus receives a profile number.

FIG. 11 is a flowchart showing a processing sequence when the external apparatus 200 receives a profile number corresponding to a profile selected by an image forming apparatus 100 in the second embodiment. The second embodiment does not perform determination processing of whether the external apparatus 200 has received a mode setting and profile number or only a profile number from the image forming apparatus 100, as represented in step S1303 of FIG. 9. That is, the external apparatus 200 always transmits a scan execution instruction to the image forming apparatus 100 via an external I/F 160 in accordance with a received mode setting.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-079440, filed Mar. 30, 2010, which is hereby incorporated by reference herein in its entirety.

What is claimed is:

1. An image forming system including an image forming apparatus which reads an image to generate image data, and an information processing apparatus which stores a plurality of profiles each including a setting for reading the image, said image forming apparatus comprising:
   a storage unit configured to acquire and store information indicating a profile;
   a selection unit configured to select a profile based on the information stored in said storage unit, in response to user designation of the profile;
   an instruction unit configured to instruct initiation of execution of an image reading job in accordance with the profile selected by said selection unit;
   a first transmission unit configured to, in response to the instructing by said instruction unit, transmit, to said information processing apparatus, identification information for identifying the profile selected by said selection unit, and optionally transmit to said information processing apparatus a setting for reading the image that corresponds to the profile selected by said selection unit;

a reception unit configured to receive a reading instruction for the image from said information processing apparatus; and a reading unit configured to read the image to generate image data in accordance with the reading instruction for the image received by said reception unit, and said information processing apparatus comprising:

a second transmission unit configured to change a setting for reading the image that is included in a profile identified from the plurality of profiles based on the identification information transmitted by said first transmission unit of said image forming apparatus into the setting for reading the image, corresponding to the profile selected by said selection unit, that is transmitted by said first transmission unit, and transmit the reading instruction for the image based on the changed profile to said image forming apparatus.

2. The system according to claim 1, wherein the setting for reading the image is whether to read the image in a color mode or read the image in a black and white mode.

3. The system according to claim 2, wherein said image forming apparatus further comprises a control unit which turns on a lighting unit comprised by a key for initiating the execution of the image reading job, in accordance with the setting for reading the image that corresponds to said profile selected by said selection unit, and in response to accepting pressing of the key, said first transmission unit of said image forming apparatus transmits, to said information processing apparatus, the setting for reading the image that corresponds to the profile selected by said selection unit, and the identification information for identifying the profile selected by said selection unit.

4. The system according to claim 1, said image forming apparatus further comprising:

a first determination unit configured to determine whether or not the reading instruction is received by the reception unit; and a display unit configured to display a warning screen in a case where the determination unit determines that the reading instruction is not received by the reception unit.

5. The system according to claim 1, said information processing apparatus further comprising:

a second determination unit configured to determine whether or not the setting is received with the profile identification information; and wherein, in a case where the second determination unit determines that the setting is received, the second transmission unit changes the setting for reading the image that is included in a profile identified from the plurality of profiles based on the identification information transmitted by said first transmission unit of said image forming apparatus into the setting for reading the image, corresponding to the profile selected by said selection unit, that is transmitted by said first transmission unit, and transmits the reading instruction for the image based on the changed profile to said image forming apparatus.

6. The system according to claim 5, wherein, in a case where the second determination unit determines that the setting is not received with the profile identification information, the second transmission unit transmits a reading instruction for the image based on the profile corresponding to the identification information transmitted by the first transmission unit.

7. An image forming method executed in an image forming system including an image forming apparatus which reads an image to generate image data, and an information processing apparatus which stores a plurality of profiles each including a setting for reading the image, the method comprising:

a storage step of causing the image forming apparatus to acquire and store information indicating a profile;

a selection step of causing the image forming apparatus to select one profile based on the information stored in the storage step, in response to user designation of the profile;

an instruction step configured to instruct initiation of execution of an image reading job in accordance with the profile selected by said selection step;

a first transmission step of causing the image forming apparatus to, in response to the instructing by said instruction step, transmit, to the information processing apparatus, a setting for reading the image that corresponds to the profile selected in the selection step, and identification information for identifying the profile selected by said selection step;

a second transmission step of causing the information processing apparatus to change a setting for reading the image that is included in a profile identified from the plurality of profiles based on the identification information transmitted in the first transmission step by the image forming apparatus into the setting for reading the image, corresponding to the profile selected by said selection step, that is transmitted in the first transmission step, and transmit a reading instruction for the image based on the changed profile to the image forming apparatus;

a reception step of causing the image forming apparatus to receive the reading instruction for the image from the information processing apparatus; and a reading step of causing the image forming apparatus to read the image and generate image data in accordance with the reading instruction for the image received in the reception step.

8. An image forming apparatus which is connected to an information processing apparatus that stores a plurality of profiles each including a setting for reading an image, and which reads the image to generate image data, the image forming apparatus comprising:

a storage unit configured to acquire and store information indicating a profile;

a selection unit configured to select a profile based on the information stored in said storage unit, in response to user designation of the profile;

a control unit configured to control to enable an operation of a key, to instruct initiation of execution of an image reading job, in accordance with the profile selected by said selection unit;

a transmission unit configured to transmit, to the information processing apparatus in response to accepting pressing of the key and the instructing, the setting for reading the image that corresponds to the profile selected by said selection unit, and identification information for identifying the profile selected by said selection unit;

a reception unit configured to receive a reading instruction for the image from the information processing apparatus; and a reading unit configured to read the image to generate the image data in accordance with the reading instruction for the image that is received by said reception unit, wherein the reading instruction for the image corresponds to the profile selected by said selection unit.

9. An image forming method executed in an image forming apparatus which is connected to an information processing apparatus that stores a plurality of profiles each including a setting for reading of image, and which reads the image to generate image data, the method comprising:
- a storage step of acquiring and storing information indicating a profile;
- a selection step of selecting a profile based on the information stored in the storage step, in response to user designation of the profile;
- a control step of controlling to enable, an operation of a key, to instruct initiation of execution of an image reading job in accordance with the profile selected by said selection step;
- a transmission step of transmitting, to the information processing apparatus in response to accepting pressing of the key and the instructing, the setting for reading the image that corresponds to the profile selected in the selection step, and identification information for identifying the profile selected by said selection step;
- a reception step of receiving a reading instruction for the image from the information processing apparatus; and
- a reading step of reading the image to generate the image data in accordance with the reading instruction for the image that is received in the reception step, wherein the reading instruction for the image corresponds to the profile selected by said selection unit.

* * * * *